3,324,196
ALKYLATION PROCESS USING ALIPHATIC
AMINE CATALYST MODIFIER
George M. Kramer, Berkeley Heights, and James L.
Carter, Chatham, N.J., assignors to Esso Research and
Engineering Company, a corporation of Delaware
No Drawing. Filed July 27, 1966, Ser. No. 568,126
24 Claims. (Cl. 260—683.51)

This application is a continuation-in-part of U.S. Ser. No. 453,514, filed May 5, 1965, and entitled, "Alkylation Catalyst," and now abandoned.

The present invention relates to an improved alkylation process. More particularly, the invention relates to the alkylation of hydrocarbons and especially to the alkylation of aliphatic and aromatic hydrocarbons with olefinic compounds. More specifically, this invention concerns the production of a product containing $C_8$ hydrocarbons by the alkylation of paraffinic hydrocarbons with olefins. In its most specific form, this invention concerns an acid catalyzed isobutane-butylene alkylation process having a high selectivity for the production of trimethylpentanes, i.e., 2,2,4-trimethylpentane. This improved production of trimethylpentane brings with it lower acid consumption. This is accomplished by adding a critical amount of an amine containing at least one long, preferably, aliphatic chain as a modifier to the acid catalyst.

It is known generally to effect the union of paraffinic hydrocarbons and olefinic hydrocarbons by processes broadly called alkylation. In alkylation, the charge includes a mixture of a paraffinic hydrocarbon and an olefinic hydrocarbon. These reactants are introduced into the reaction zone under reaction conditions of temperature and pressure. After a sufficient period of time, a reaction product is obtained which in turn is called the hydrocarbon alkylate. The alkylate is a saturate. Conditions which are suitable for alkylation will also cause polymerization of the olefinic reactant. It is therefore necessary to maintain a relatively low concentration of the olefinic compound. As a rule, there is a problem of polymerization of olefinic compounds under high temperature conditions that generally requires the use of lower temperatures.

The alkylation of aliphatic and aromatic hydrocarbons with olefinic hydrocarbons has been used widely in the petroleum industry. The particular uses will vary. Perhaps most important of all is the alkylation of certain aliphatic compounds to provide high octane components for gasoline blending. An alternate area of use is the providing of compounds which are useful as intermediates in organic processes to produce solvents, etc.

A particular importance within the realm of alkylation is the reaction of butylenes and isobutane to form octanes and in particular isooctane, i.e., 2,2,4-trimethylpentane and other trimethylpentanes. The butylenes, generally a mixture of butene-1, cis- and trans-butene-2 and isobutylene, are reacted in the liquid phase in the presence of a strong acid such as for example, hydrofluoric acid, sulfuric acid or fluorosulfonic acid. The most widely utilized acid is sulfuric acid. The temperature for the reaction generally varies between 0 and 120° F., pressures varying from ambient to superatmospheric may also be utilized, a suitable range of pressures would be 0 to 150 p.s.i.g. The reaction can be postulated as proceeding as follows:

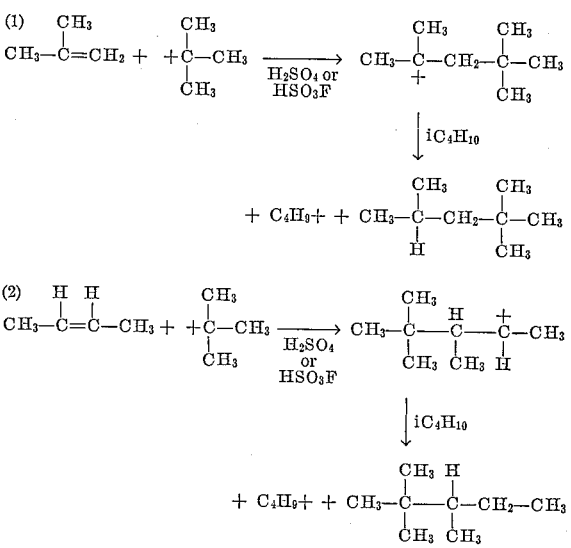

The most important factor in this reaction is believed to be the hydride extraction step. The hydride extraction step refers to the removal of an H$^-$ from the i-$C_4H_{10}$ and the subsequent or simultaneous addition of the H$^-$ to $C_8+$ to form trimethylpentane from the appropriate ion. Alkylation reactions, as exemplified by the strong acid catalyzed reaction of butylenes and isobutane to form octane, have been plagued with several difficulties in the past. While these difficulties will be discussed hereinafter with respect to the formation of octane, it is to be understood that they are equally applicable to any alkylation reaction. One basic problem concerns the fact that the formation of the 1:1 olefin-paraffin adduct, e.g., octane, does not proceed as rapidly as would be desired. Thus, the adduct ions, e.g., $C_8+$ ions, participate in undesirable side reactions at a much faster rate than the desirable but slower hydride extraction reaction to form the stable 1:1 olefin-paraffin adduct, e.g., octane. These side reactions lead to the formation of $C_{12}+$ products which then undergo cracking reactions to form undesirable lighter hydrocarbons such as, for example, $C_5$, $C_6$ and $C_7$ light alkylate components. The result, of course, is to minimize the production of the desired $C_8$ products and to lower the octane number of the products obtained.

Further difficulties with the alkylation reaction, have been encountered with respect to acid consumption. Typically, in the past, when $H_2SO_4$ was utilized as a catalyst, great amounts of this catalyst were consumed. Earlier methods had made an attempt to cut down on this acid consumption. They have not met with any great degree of success. Some of these methods include lowering the reaction temperature, increasing the mixing efficiency and increasing the isoparaffin to olefin ratio in the feed.

Recently, U.S. Patent No. 2,880,255 was issued. This patent was concerned with producing an improved alkylation reaction. This was accomplished by adding a promoting agent to the alkylation catalyst. The bulk of the teaching within this patent concerns the use of a mercaptan promoting agent. The theory advanced by patentees was that the common phase surface area between catalysts and reactants was increased by the presence of the promoter and thereby the speed of the reaction and the selectivity correspondently improved. By way of an incidental teaching, patentees mention that aliphatic amines having at least one normal alkyl chain which in turn has 8 to 20 carbon atoms may be used in addition to mercaptans. There was no further teaching concerning these aliphatic amines and no mention was made of any particular quantity of them which would be desirable.

According to this invention, it has unexpectedly been found that improved selectivity, decreased induction period and reduced consumption of the strong acid catalyst may be effected by contacting an alkylatable hydrocarbon and olefin, at reaction conditions, in the presence of a modified strong acid catalyst. The strong acid catalyst is modified by adding to it a small, critical amount of a promoter, the said promoter being an amine, an ammonium salt or closely related compound such as an amine oxide, amide, or bifunctional amine which forms cation derivatives in a strong acid. Regardless of which promoter is utilized, it must contain at least one $C_8$–$C_{20}$, preferably aliphatic group.

This invention is intended to include the use of primary, secondary and tertiary amines and ammonium salts having at least one long normal aliphatic group as an alkylation promoter. The aliphatic group must have a length of $C_8$–$C_{20}$. Regardless of which of the above additives is utilized, it must be present in a critical amount; this critical amount being 0.0005 to .3 wt. percent of the alkylation catalyst utilized. In the preferred form of this invention the $C_8$–$C_{20}$ aliphatic group is an alkyl group and in the most preferred form a normal alkyl group.

The presence of this promoter serves to decrease considerably the consumption of the strong acid alkylation catalyst. In fact, about 10 to 40% reduction in acid catalyst consumption is observed. In addition, the presence of this promoter also serves to increase the octane yield and quality when butane and butylenes are contacted to form isooctane. The improved quality results from two factors. One is that the $C_8$ fraction contains a higher percentage of trimethylpentanes with a distribution favoring the high octane isomers. Another is that the selectivity of the product to $C_8$ is increased at the expense of $C_5$ to $C_7$ and $C_9$, $C_{10}$ and heavier components of lower octane quality.

The length of the aliphatic chain, which in the most preferred form of the invention is a normal alkyl chain, must vary between $C_8$–$C_{20}$, the preferred range for this chain may vary between $C_{10}$–$C_{18}$ and the most preferred range for the length of this chain would be $C_{12}$–$C_{17}$. The invention is also intended to include the use of the $C_8$–$C_{20}$ aliphatic amines. Included in the amines to be utilized in the instant invention are the following: dodecylamine, cetylamine, methylnormal hexadecylamine, methyldodecylamine, didodecylamine, hexadecyldimethylamine, hexadecyl-methyl-decylamine, dodecyldimethylamine, dodecyltrimethyl ammonium bromide, cetyltrimethyl ammonium bromide, tridecyldimethylbenzyl ammonium bromide.

The amount of additives to be utilized is also extremely critical. If too much additive is introduced into the system, a relatively stable emulsion forms. This emulsion prevents the proper functioning of the alkylation reaction. For example, stirring a concentrated sulfuric acid solution containing 1 wt. percent n-hexadecylamine, n-$C_{16}H_{33}NH_2$, with an equal volume of typical debutanized alkylate product yields an emulsion which will not break cleanly for more than a day. Such an emulsion would be impractical to work with in commercial equipment where settling times, considerably shorter than an hour, are required. On the other hand, emulsions formed with about 0.01% n-hexadecylamine in the acid and equal volumes of acid and debutanized alkylate settle in about the same time as these formed with unpromoted acid.

Because of the above problem of emulsion formation, about 0.0005 to 0.3 wt. percent of an amine or ammonium salt containing at least one long aliphatic chain, preferably a long normal alkyl chain, is to be added to the strong acid catalyzed alkylation reaction. More particularly, 0.001 to 0.1 wt. percent of the long chain aliphatic group containing amine or ammonium salt is to be added and most preferably 0.005 to 0.05 wt. percent of the long normal aliphatic group containing amine or ammonium salt is added.

The most preferred additive is a primary amine having a $C_8$ to $C_{20}$ normal alkyl group; the primary amine brings extremely effective results when added to a strong acid catalyzed alkylation reaction.

The instant additive may be utilized in all alkylation reactions such as the well-known reactions of an olefin with an alkylatable compound which may be an aliphatic hydrocarbon, an aromatic hydrocarbon or perhaps an alicyclic compound. As mentioned previously, the most important use for this catalyst concerns the reaction of butylenes and isobutanes to form isooctane. However, within the realm of the aliphatic alkylations this invention is intended to cover all reactions between olefins and paraffins. This would include, of course, the reaction between an olefin having from $C_3$ to $C_{10}$ carbon atoms and a paraffin having from $C_4$ to $C_{10}$ carbon atoms. All reactions between these olefins and isoparaffins are intended to fall within the scope of this invention, regardless of whether or not the olefins are iso or straight chain derivatives. It is apparent that several different paraffins and olefins may be reacted to form octanes or other highly branched paraffins suitable for motor gasoline. For instance, isopentane and propylene may be reacted to form isooctanes while isobutane and propylene yield mainly isoheptanes.

Several different strong acids are known which may be utilized in the alkylation of an aliphatic or aromatic hydrocarbon with an olefin. Perhaps the best known of these catalysts is sulfuric acid and this invention is intended to include all sulfuric acid alkylations. It is also applicable to the other strong acid catalyzed alkylation reactions; these other acids include hydrofluoric and fluorosulfonic acid. Other strong acids could be enumerated but no advantage is seen in merely reiterating those acids which are well-known in the art. The above described acids are all Bronsted acids or substances which readily give up a proton.

In the same fashion, the Lewis acids or electron pair acceptors may be used as alkylation catalysts in conjunction with the aliphatic amine promoter of the instant invention. Typical Lewis acids which may be utilized are $AlBr_3$, $AlCl_3$, $BBr_3$, $SbF_5$, $SbCl_5$, $BF_3$, etc. It should be noted that these are the strong Lewis acids.

In general, any of the conventional catalytic alkylation reactions can be carried out by the process of the instant invention. Thus, the alkylation reaction can comprise reaction of an isoparaffin with an olefin, or reactions of an aromatic hydrocarbon with an olefin or other alkylating agent. These reactions, of course, must take place in the presence of a suitable alkylation catalyst. In place of an olefin as an alkylation agent, various alcohols and ethers, such as isopropyl alcohol, tertiary-butyl alcohol, secondary butyl alcohol, isopropyl ether and the like can be used as alkylating agents. Likewise, the corresponding alkyl esters, such as the alkyl halides, sulfates, phosphates, fluorides of the olefins, may be used as the alkylation agent with an appropriate, compatible alkylation catalyst.

The alkylation reaction is carried out with the hydrocarbon reactants in the liquid phase; however, the reactants need not be normally liquid hydrocarbons. The reaction conditions can vary in temperature from subzero temperatures to temperatures as high as 200° F. and can be carried out at pressures varying from atmospheric to as high as 1000 p.s.i. and higher. Space velocities ranging from about 0.01 to about 20 volumes of olefin/volume acid-hour may be utilized.

Concerning the sulfuric acid catalyzed reaction of isobutane and butylene to form isooctane; the temperatures utilized would vary between 10 and 100° F., pressures would be between atmospheric and 100 p.s.i.g. and the reaction time would be about 10 to 60 minutes although much shorter times may be possible in special equipment. In this reaction as in alkylation generally, the reaction takes place in the liquid phase or at the acid-hydrocarbon interface and requires some degree of agitation.

As mentioned above, 0.0005 to .3 wt. percent of a long chain amine must be added to the strong acid catalyzed reaction. If less than the critical amount of amine is added, the amine is not present in sufficient strength to produce the desired results. The minimum concentration of amine to be added will vary somewhat with the length of the alkyl chain, the purity of the compound and the presence of any branching in the chain. An estimate of this concentration may be obtained for a specific compound by constructing a surface tension or interfacial tension, (acid-paraffin) versus log concentration plot for the compound in $H_2SO_4$ and graphically determining the concentration at which the amine becomes surface active. If too much amine is added, an emulsion is formed which in some cases will last indefinitely and in other instances will settle out after a prolonged period of time. In the instances where the emulsion will settle out after a prolonged period of time, the alkylation reaction will be impractical to carry out on a commercial scale. This is because commercial reactors have fixed settling capacity and one cannot process feed more rapidly than the settler can separate the alkylate product from the acid emulsion.

EXAMPLE 1

This example illustrates the improved results which may be obtained when utilizing a small amount of a long chain amine which in this case is an aliphatic amine, cetylamine, as a promoter in conjunction with a sulfuric acid catalyst. In particular, in this example a straight run which made use of $H_2SO_4$ was compared with a mixed acid catalyst, the catalyst comprising 98% sulfuric acid and 0.01 wt. percent of cetylamine. Constant temperatures were used for both runs, i.e., 50° F. and the pressure was also kept at a constant level of 80 p.s.i.g.

TABLE I

| Catalyst | $H_2SO_4$ | | $H_2SO_4$ .01 wt. percent Cetylamine | |
|---|---|---|---|---|
| Feed, Wt. Percent: | | | | |
| i-$C_7C_{10}$ | 94 | | 94 | |
| $C_4H_8$* | 6 | | 6 | |
| Olefin Space Velocity, V./Hr./V | 0.08 | 0.15 | 0.08 | 0.15 |
| Production Distribution ($C_5$-$C_8$), Wt. Percent: | | | | |
| $C_5$-$C_7$ | 12 | 13.2 | 10 | 12.6 |
| $C_8$ | 88 | 86.8 | 90 | 87.4 |
| 224 TMP in $C_8$ | 35 | 34 | 40 | 39 |
| MON | 95.0 | 94.7 | 95.4 | 95.2 |

*Refinery Butylenes.

From the above table, it is apparent that the use of a small amount of a long chain aliphatic amine produces a highly significant improvement in the alkylation reaction. The combination of $H_2SO_4$ and the amine resulted in an octane improvement of 0.4–0.5 units and produced 1.5–2% more $C_8$ and 5% more 224 trimethylpentane in the $C_8$ fraction. The acid consumption was also considerably lower for the combined cetylamine $H_2SO_4$ catalyst. This was evidenced by the fact that after equivalent amounts of feed had passed through a reactor containing first fresh 98% of $H_2SO_4$ and then 98% $H_2SO_4$ modified with 0.01% cetylamine the respective spent acid strengths were 93.2 and 94.9. Varying the olefin space velocity did not change the advantage to be gained by using the combined amine sulfuric acid catalyst. That is to say the advantage was present at different olefin feed rates.

EXAMPLE 2

The purpose of this example was to indicate the criticality of the range of cetylamine which may be added to $H_2SO_4$ in order to provide a better alkylation catalyst, without causing undue settling problems.

In an effort to determine the critical range of amine necessary for the instant invention, a series of mixing experiments were carried out. Two milliliters of sulfuric acid taken from a commercial alkylation reactor, was mixed with one milliliter of three methylpentane. The three methylpentane is a typical alkylation product and was, of course, maintained in the liquid phase. The two were vigorously shaken in a glass vial for 5 minutes on a conventional Wig-L-Bug shaker. Measurements were made of the time for the acid and three methylpentane phases to separate from the emulsion. Experiments were then carried out with 0.01, 0.1 and 1.0 wt. percent of cetylamine added to the acid. The following results were observed; at 0.01% of cetylamine added to the acid there was no measurable effect on the settling rate, with 0.1% present, 70% of the hydrocarbon phase separated in 3–6 minutes while at 1% a stable emulsion formed. This emulsion did not break in one hour. Thus from the above it is apparent that working with as little at 1 wt. percent of cetylamine would provide for a stable emulsion and disrupt a commercial reactor. Consequently, applicants' range of 0.0005 to .3 wt. percent is critical and must be followed in order to successfully utilize the process of the instant invention.

EXAMPLE 3

In this example, 350 cc. of fresh concentrated sulfuric acid containing 1.0 ft. percent cetylamine was mixed with 350 cc. of debutanized alkylate at a reaction temperature of 75–80° F. and atmospheric pressure. The mixture was stirred for 1 minute in a standard glass mixing flask. An emulsion formed which did not settle clearly in 24 hours. Examples 2 and 3 show that emulsions containing 50 to 67% acid which are typical refinery conditions are too stable to allow for commercial operation with as little as 1 wt. percent cetylamine in the acid.

Although the above examples were restricted to alkylation of paraffins, it is readily apparent to one skilled in the art that this invention would equally be applicable to the alkylation of aromatics.

It is also readily apparent that so long as at least one $C_8$ to $C_{20}$ aliphatic group is present in an amine or ammonium salt there may be branched carbons affixed to any point on the $C_8$ to $C_{20}$ chain.

Although this invention has been described with some degree of particularity, it is intended only to be limited by the attached claims.

What is claimed is:

1. A process for carrying out an alkylation reaction which comprises contacting a hydrocarbon mixture containing an alkylatable paraffinic hydrocarbon and an olefinic alkylating agent at alkylation conditions with a catalyst composition comprising a strong acid selected from the group consisting of sulfuric acid, hydrofluoric acid and fluorosulfonic acid and 0.0005 to .3 wt. percent of an amine, the said amine having at least one aliphatic group of $C_8$–$C_{20}$.

2. The process of claim 1 wherein said acid is hydrofluoric acid.

3. The process of claim 1 wherein said acid is sulfuric acid.

4. The process of claim 3 wherein said amine is present in the amount of about 0.001 to 0.1 wt. percent.

5. The process of claim 3 wherein said alkylatable paraffinic hydrocarbon is a $C_4$ to $C_{10}$ isoparaffin and said olefinic alkylating agent is a $C_3$ to $C_{10}$ olefin.

6. A process for carrying out an alkylation reaction which comprises contacting a hydrocarbon mixture containing an alkylatable paraffinic hydrocarbon and an olefinic alkylating agent at alkylation conditions with a catalyst composition comprising a strong acid selected from the group consisting of sulfuric acid, hydrofluoric and fluorosulfonic acid and 0.0005 to .3 wt. percent of an aliphatic amine, the said amine having at least one aliphatic group of $C_8$–$C_{20}$.

7. The process of claim 6 wherein the said isoparaffinic hydrocarbon is selected from the group consitsing of $C_4$ to $C_{10}$ isoparaffins and the said olefinic hydrocarbon is selected from the group consisting of $C_3$ to $C_{10}$ hydrocarbons.

8. The process of claim 6 wherein the said strong acid is sulfuric acid.

9. The process of claim 6 wherein the said strong acid is HF.

10. The process of claim 6 wherein said aliphatic group is an alkyl group.

11. An improved process for the alkylation of butylenes with isobutane to form a maximum amount of isooctanes while minimizing other undesirable reactions which comprises contacting the said butylene and the said isobutane with a catalyst under alkylation conditions, the said catalyst comprising a strong acid selected from the group consisting of sulfuric acid, hydrofluoric acid, and fluorosulfonic acid and 0.0005 to .3 wt. percent of an aliphatic amine, said amine having at least one normal alkyl group of $C_8$ to $C_{20}$.

12. The process of claim 11 wherein the said strong acid is $H_2SO_4$.

13. The process of claim 11 wherein the said strong acid is HF.

14. An improved process for the alkylation of butylene with isobutane to form a maximum amount of isooctane while minimizing cracking which comprises contacting said butylenes and said isobutane at a temperature of 0 to 100° F. and a pressure of 0 to 150 p.s.i.g. with a catalyst composition comprising sulfuric acid and about 0.001 to 0.1 wt. percent of a promoter, said promoter consisting of a compound selected from the group consisting of primary, secondary, tertiary aliphatic amines and the salts of said amines having at least one aliphatic $C_8$ to $C_{20}$ chain.

15. The process of claim 14 wherein the said acid is $H_2SO_4$.

16. The process of claim 14 wherein the said acid is HF.

17. An improved alkylation process which comprises contacting a $C_4$ to $C_{10}$ isoparaffin and a $C_3$ to $C_{10}$ olefin at a temperature of 0 to 100° F. and a pressure of 0 to 150 p.s.i.g. with a catalyst, the said catalyst comprising a strong acid selected from the group consisting of sulfuric acid, hydrofluoric acid, and fluorosulfonic acid and about 0.001 to 0.1 wt. percent of a $C_8$ to $C_{20}$ aliphatic amine.

18. The process of claim 17 wherein the said strong acid is HF.

19. The process of claim 17 wherein the said strong acid is $H_2SO_4$.

20. The process of claim 17 wherein the said strong acid is fluorosulfonic acid.

21. A process for carrying out an alkylation reaction which comprises contacting a hydrocarbon mixture containing an alkylatable paraffinic hydrocarbon and an olefinic alkylating agent at alkylation conditions with a catalyst composition comprising a strong acid selected from the group consisting of sulfuric acid, hydrofluoric acid and fluorosulfonic acid and 0.0005 to 0.3 wt. percent of a promoter, said promoter selected from the group consisting of primary, secondary, tertiary aliphatic amines and the salts of said amines having at least one $C_8$ to $C_{20}$ alkyl group.

22. The process of claim 21 wherein said strong acid is $H_2SO_4$.

23. The process of claim 21 wherein said amine is present in the amount of about 0.001 to 0.1 wt. percent.

24. The process of claim 23 wherein said alkyl group is a normal alkyl.

References Cited

UNITED STATES PATENTS 2,423,401 7/1947 O'Kelley et al. -- 260—683.63 X
2,880,255 3/1959 Davis et al. ---- 260—683.63 X DELBERT E. GANTZ, *Primary Examiner.*

R. H. SHUBERT, *Assistant Examiner.*